April 16, 1929.  S. K. DENNIS  1,709,565
PLANTER FEED MECHANISM
Filed Sept. 4, 1924
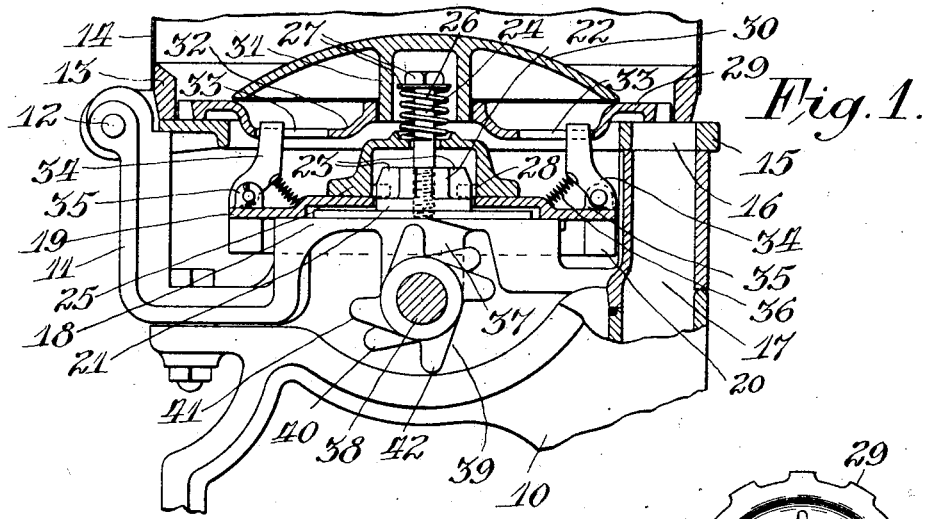
Fig. 1.
Fig. 5.
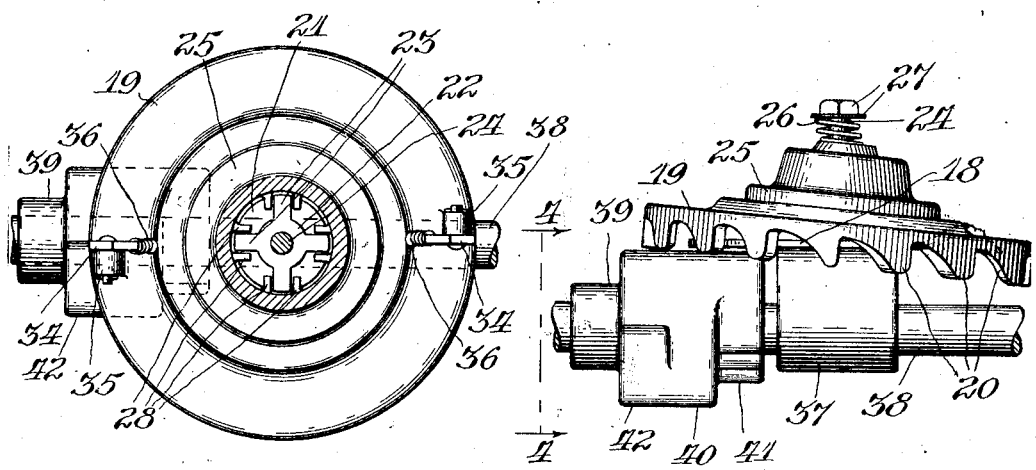
Fig. 2
Fig. 3.
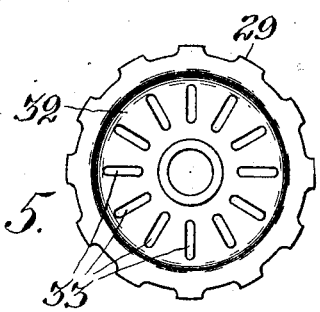
Fig. 4.
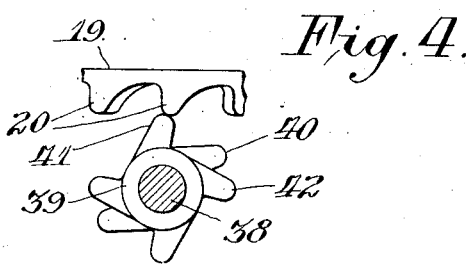
Inventor.
Samuel K. Dennis,
By [signature]
Atty.

Patented Apr. 16, 1929.

1,709,565

UNITED STATES PATENT OFFICE.

SAMUEL K. DENNIS, OF CHICAGO, ILLINOIS, ASSIGNOR TO INTERNATIONAL HARVESTER COMPANY, OF CHICAGO, ILLINOIS, A CORPORATION OF NEW JERSEY.

PLANTER FEED MECHANISM.

Application filed September 4, 1924. Serial No. 735,735.

This invention relates to seed dispensing mechanism for corn planters and particularly to the type of machine in which seeds are discharged singly from a seed plate driven from the carrying wheels of the planter through suitable intermediate mechanism.

The purpose of the invention is to provide improved mechanism for varying the amount of movement given the seed plate to vary the number of seeds discharged, and the invention is more particularly directed to improvement of the drive mechanism in planters of the type employing a series of pinions shiftable into engagement with the gear wheel or plate that drives the seed plate and also employing interchangeable seed plates which have parts interlocking with the drive plate, as, for example, in the patent to Graham No. 1,066,601, July 8, 1913. In previous mechanisms it has generally been impracticable to shift the driving pinions to vary the feed except when the mechanism was in a certain position and at rest, owing to interference between gear teeth and the necessity for maintaining a fixed relation between the driving and driven parts. Also, it has heretofore been necessary, when changing seed plates, to see that the interlocking parts between the drive plate and the seed plate were in proper position.

In the present invention the main objects are to provide strong and simple seed plate driving gearing including means permitting shifting of the drive pinions at any time during operation of the machine irrespective of possible clashing of the gear teeth and to provide interengaging connections between the seed plate and drive plate that will automatically interlock regardless of the relative angular positions of the plates.

In the accompanying drawings,—

Fig. 1 is a vertical section through the seed dispensing mechanism of a corn planter embodying the invention;

Fig. 2 is a plan view of the drive plate;

Fig. 3 is a side view of the drive plate and drive pinion with the drive plate out of normal position;

Fig. 4 is a detail view looking in the direction of the arrows on the line 4—4 (Fig. 3); and Fig. 5 is a plan view of a seed plate.

Referring to the drawing, 10 indicates one of the runner frames of the usual type of two-row corn planter. This runner frame has secured thereto a base casting 11 to which there is hinged at 12 the annular bottom casting 13 of the hopper 14. Between the casting 11 and the bottom casting 13 there is also hinged at 12 a plate locking ring 15, which normally rests on the casting 11 and is provided at one side with an opening 16 registering with the conduit 17 in the runner frame. This ring can be locked to the hopper, as well known, and supports the seed plate. The casting 11 is formed with a centrally disposed circular bearing table 18 having a flat upper edge on which is seated a driving plate 19 the periphery of which extends beyond the table 18 and is provided on its under side with circumferentially spaced depending gear teeth 20. The drive plate 19 is formed with a comparatively large central aperture which is designed to fit over a cylindrical boss 21 fixed to or formed integral with the bearing table 18. One purpose of this boss is to properly center the drive plate. The boss 21 has an upwardly extending reduced portion 22 which is connected with the lower portion by four equally spaced radial fins 23. The extension 22 of the boss 21 is provided with a centrally threaded opening which serves to receive the threaded end of an upright post 24 which extends above a dome-shaped pressure element such as the cap or washer 25 the lower flanged edge of which rests on the drive plate 19. Above this washer the post 24 carries a coil spring 26 which presses on top of the washer 25 and is confined by a bolt head and washer 27. The chamber within the washer 25 houses the boss 21 and its wall is provided with spaced pairs of inwardly projecting lugs 28 which embrace the fins 23 and prevent rotary movement of the washer 25 while permitting it to yield upwardly. The locking plate 15 heretofore described serves as a bearing for the rotary seed plate 29 within the hopper having the usual seed cells in its outer edge, which pass over the discharge opening 16 in the locking ring. The usual cover plate 30, which forms part of the hopper bottom, extends over the central portion of the seed plate and is formed with a tubular extension 31 on its under side which receives the upper end of the post 24. An annular zone on the part of the seed plate 29 which is covered by the dome-shaped plate 30 is dished or depressed as shown at 32 and this depressed portion is provided with a circumferential series of equally spaced slots 33. For cooperation with these slots the drive plate 19 is provided with a pair of diametrically positioned, upwardly extending ears 34 which are pivotally connected to lugs 35 on the upper face of plate 19. The ends of the ears 34 are offset as shown in Fig. 1 and coil springs 36 normally press the ears upwardly into engagement with the slots 33 in the seed plate. The bearing table 18 is formed with a horizontal journal bearing 37 on its under side, which carries the drive shaft 38 of the planter on which there is fixed a drive pinion 39 which is divided into three parts, 40, 41 and 42, having, respectively, 2, 3 and 4 teeth spaced equal distances from one another, the two teeth on part 40 being therefore arranged diametrically opposite each other.

For shifting pinion 39 the shaft 38 may be made axially adjustable in its bearings through any suitable mechanism, the pinion 39 being located in position enabling any of its series of teeth to be brought into mesh with the depending gear teeth 20 on the drive plate 19.

The number of teeth on each section of pinion 39 is so related to the gear teeth 20 on plate 19 and to the number of seed cells on the seed plate that engagement of a tooth on pinion 39 with a tooth 20 on plate 19 will give the seed plate a sufficient amount of angular movement to move one seed cell across the opening of conduit 17, and it follows that, if the part of the pinion having two teeth is in mesh with the drive plate 19, two seeds will be released at each revolution of the shaft 38, while either three of four seeds will be released when either parts 41 or 42 are moved into mesh. As heretofore stated, previous mechanisms required that the teeth on pinion 29 and on drive plate 19 be in certain position to permit shifting of the pinion, but with the construction above described this becomes unnecessary, as the drive plate 19 will yield upwardly, should the respective gear teeth clash, and the teeth will ride over each other as illustrated in Fig. 4, thereby slightly delaying movement of the plate 19 and assuming proper meshed relation with the next tooth on the pinion 39, the plate 19 being returned to normal position on its seat through pressure of the spring 26. It will be seen also that the construction of the inter-engaging means between the seed plate and the drive plate is such that there is no interference to movement of one plate towards the other, as the ears 34 can move upwardly through slots 33 and can yield if necessary. Moreover, the yieldable character of the ears 34 permits the seed plate to be brought into operating position without regard as to whether the ears immediately engage in the slots 33 or not, as they will automatically spring into two opposite slots as soon as rotation of the drive plate begins.

It will be evident from the above disclosure that simple mechanism is provided which will maintain proper relation between the driving mechanism and the seed plate and which may be operated without the necessity of observing any requirements as to predetermined positions of the various parts of the mechanism as in prior devices.

The construction herein described exemplifies the preferred form of the invention, but it will be obvious to those skilled in the art that various modifications may be made within the scope of the following claims.

What is claimed as new is:

1. In a planter feed mechansim, the combination of a horizontal bearing table, a drive shaft journaled beneath the table, a unitary drive plate rotatably seated on the table with a portion of its lower surface extending free of the table and having circumferentially spaced depending ratchet teeth thereon, a pinion on the drive shaft in position to mesh with said teeth, yielding retaining means engaging the upper surface of the drive plate for permitting upward displacement of the drive plate, a horizontal seed plate rotatably supported above the drive plate, and interengaging parts on the opposed faces of the respective plates comprising projections on the drive plate extending through openings in the seed plate.

2. In a planter feed mechanism, the combination of a horizontal bearing table, a drive shaft journaled beneath the table, a unitary drive plate rotatably seated on the table and having circumferentially spaced teeth, a pinion on the drive shaft in position to mesh with said teeth, yielding retaining means normally keeping the drive plate on its seat, but capable of permitting the plate to move upwardly so that its teeth do not mesh with the pinion, a horizontal seed plate rotatably supported above the drive plate, and interengaging parts on the drive plate and seed plate constructed to permit movement of the drive plate upwardly.

3. In a planter feed mechanism, the combination of a unitary drive plate, a removable seed plate supported above the drive plate and spaced therefrom, both plates being rotatable on the same vertical axis, means engaging the under side of the drive plate for driving it, yielding means normally holding the drive plate against movement toward the seed plate, and means constantly connecting the drive plate and seed plate insuring simultaneous movement of those plates at all times during normal operation of the feed mechanism including parts movable on each other in the direction of the axis of the plates.

4. In a planter feed mechanism, the combination of a drive plate, a removable seed plate supported above the drive plate and spaced therefrom, both plates being rotatable on the same vertical axis, interengaging driving parts on the opposed faces of the respective plates affording a constant driving connection between them, and structures permitting certain of said parts to yield towards one of the plates.

5. In a planter feed mechanism, the combination of a drive plate, a removable seed plate supported above the drive plate and spaced therefrom, both plates being rotatable on the same vertical axis, slots formed in the lower face of the seed plate, and spring pressed pivoted fingers projecting from the upper face of the drive plate and having ends interengaging with the seed plate slots.

6. In a planter feed mechanism, the combination of a flat bearing table, a toothed drive plate seated on said table and rotatable on a vertical axis, a drive pinion beneath the drive plate in position to engage the teeth on the periphery of the drive plate, a retaining washer engaging the upper face of the drive plate, a central upright post above the bearing table and normally held against vertical movement, and a coil spring carried by the post above the washer and bearing thereon.

7. In a planter feed mechanism, the combination of a flat bearing table, a drive plate seated on the table and rotatable on a vertical axis, circumferential gear teeth on the plate, a drive gear beneath the plate and shiftable into and out of mesh with said teeth, and means yieldingly retaining the plate in position and permitting upward tilting movement thereof if the gear teeth clash in shifting the gear.

8. In a planter feed mechanism, the combination of a bearing table, a drive shaft journaled adjacent the table, a drive plate rotatably seated on the table with a portion of its surface extending free of the table and having gear teeth thereon, a pinion on the drive shaft in position to mesh with said teeth, yielding retaining means acting upon the drive plate for permitting tilting displacement of the drive plate, a seed plate rotatably supported above the drive plate, and driving connections between the drive plate and the seed plate.

9. In a planter feed mechanism, the combination of a bearing table, a drive shaft journaled adjacent the table, a drive plate rotatably seated on the table and having circumferentially spaced teeth, a pinion on the drive shaft in position to mesh with said teeth, yielding retaining means normally keeping the drive plate on its seat but capable of permitting displacement of the plate, a seed plate rotatably supported and connected to the drive plate, and interengaging connections between the drive plate and seed plate constructed to permit tilting movement of the drive plate relative to the seed plate.

10. In a planter feed mechanism, the combination of a drive member, a removable seed plate supported above the drive member and spaced therefrom, both the drive member and the seed plate being rotatable on the same vertical axis, interengaging driving parts located between the plate and the member and affording a normally constant driving connection between those elements, including means permitting certain of said parts to yield toward the driving member.

11. In a planter feed mechanism, the combination of a drive plate, a removable seed plate supported adjacent the drive plate and spaced therefrom, both plates being rotatable on the same vertical axis, individually spring pressed engaging members projecting from the upper face of the drive plate, and complemental engaging means on the lower face of the seed plate cooperating with said members.

12. In a planter feed mechanism, the combination of a support, a drive member seated on said support and rotatable on a vertical axis, gear teeth on said member, a drive pinion beneath the drive member in position to engage the gear teeth on the member, a spring constantly urging the member toward the support, and means coacting with said spring to maintain the member properly centered relative to the support and the drive pinion.

13. In a planter feed mechanism, the combination of a support, a drive plate seated on the support and rotatable on a vertical axis, gear teeth on the plate, drive gears adjacent the plate and shiftable into and out of mesh with said teeth, and means yieldingly retaining the plate in position and permitting tilting movement thereof if the gear teeth clash in shifting the gears.

14. A planter feed mechanism comprising, in combination, a drive plate, a removable seed plate supported adjacent the drive plate and spaced therefrom, fingers projecting from the drive plate and extending through the seed plate so as to transmit rotation thereto, a support upon which the drive plate is rotatable, a shiftable pinion for operating the drive plate, means associated with the support for permitting movement of the drive plate away from the pinion, and structure associated with said means for maintaining the drive plate in properly centered condition relative to the pinion under normal conditions.

15. A planter feed mechanism comprising, in combination, a support, a rotatable drive plate seated upon the support and formed with a central opening, centering means fixed with relation to the support and extending through said opening, gear teeth on the drive plate, an endwise shiftable pinion carrying different sets of teeth any one of which is adapted to be shifted into mesh with the teeth of the drive plate, and means normally yieldingly retaining the drive plate in position upon said support but permitting a movement of the drive plate away from the pinion if the gear teeth of the drive plate at any time clash with the teeth of the pinion.

16. A planter feed mechanism comprising, in combination, a drive plate, a rotatable and removable seed plate supported adjacent the drive plate, fingers extending from the face of the drive plate through openings in the seed plate for transmitting like rotary movements of one of said plates to the other, spring means for permitting the drive plate to move toward the seed plate whereupon said fingers move through the seed plate, and guiding means cooperating with said spring means to cause the drive plate to return to properly centered condition after it has moved toward the seed plate.

17. A planter feed mechanism comprising, in combination, a support, a rotary drive plate seated upon the support, a rotary removable seed plate supported adjacent the drive plate, and fingers yieldable relatively to the drive plate and normally extending into engagement with complemental parts on the seed plate so as to be constantly capable of transmitting rotation from the drive plate to the seed plate.

18. A planter feed mechanism comprising, in combination, a support, a drive plate seated on the support and rotatable relative thereto, a multiple gear pinion rotatably supported adjacent the drive plate and having a plurality of gears any one of which is adapted to mesh with teeth upon the drive plate, and means yieldable against spring resistance for permitting limited tilting movement of the drive plate in a direction away from the pinion at any time during the operation of the mechanism.

19. A dispensing mechanism comprising, in combination, a hopper, a rotary discharging element in the hopper, a rotary drive plate adjacent the discharge element, and power transmitting connections yieldable with respect to the drive plate and extending into engagement with the discharging element to transmit rotary motion thereto, all of the above mentioned elements being so associated and arranged as to permit the removal of the discharging element from its operative position and the substitution of another similar element therefor without the positioning of the substitute discharging element in my particular position radially with respect to said power transmitting connections.

In testimony whereof I affix my signature.

SAMUEL K. DENNIS.